INVENTOR
*Edmund L. Mangan*

United States Patent Office 3,482,098
Patented Dec. 2, 1969

3,482,098
TEMPERATURE AND COMPOSITION COMPENSATOR FOR RADIATION THICKNESS GAUGES
Edmund L. Mangan, Bethlehem, Pa., assignor to Bethlehem Steel Corporation, a corporation of Delaware
Filed Oct. 10, 1967, Ser. No. 674,280
Int. Cl. G01t 1/16
U.S. Cl. 250—83.3                                   1 Claim

ABSTRACT OF THE DISCLOSURE

A device, for use in an X-ray thickness gauge, for compensating for variations in the intensity of X-rays passing through a material due to deviations in the temperature and composition of the material from predetermined calibration standards. A signal from a pyrometer positioned above the material is converted into a percentage temperature compensation signal which is added to a percentage composition compensation signal. The summed signal is then scaled to the nominal thickness of the material to yield an output signal indicative of the deviation in the measured thickness from the actual thickness due to temperature and composition deviations.

BACKGROUND OF THE INVENTION

This invention relates to radiation gauges for measuring the thickness of a material, and more particularly to a device for compensating for deviations in the measured thickness from the actual thickness due to deviations in the temperature and the composition of the material from predetermined calibration standards.

Penetrating radiation, e.g. X-rays, has been employed in the prior art for measuring the thickness of a material. One type of apparatus comprised a source of X-rays on one side of the material and X-ray detecting means on the other side of the material, the intensity of the radiation transmitted through the material being inversely proportional to the thickness of the material. The thickness of the material was determined by comparing the output of the detecting means with a predetermined value based upon measurements of a standard material of known thickness.

The amount of X-ray absorption by any material depends upon the composition and the temperature thereof. The basic equation for radiation absorption is as follows:

(a)                     $I = I_o e^{-(ut)}$ where $I$ is the intensity of the radiation transmitted through the material, $I_o$ is the intensity of the incident radiation, $u$ is the absorption coefficient of the material, $t$ is the thickness of the material, and $e$ is the natural logarithmic base. The absorption coefficient $u$ is equal to the mass absorption coefficient of a material multiplied by its density.

As a material is heated its volume, and hence its density, changes. Thus, any difference between the temperature of a material being measured and the temperature at which the standard material was measured will result in an inaccurate measurement. For example, steel strip measured at 1800° F. appears to be about 2½% thinner than at 70° F.

The absorption coefficient of a material is a function of its composition. Thus, if the composition of a material being measured varies from that of the standard material, any thickness measurements will be inaccurate. Depending upon the composition of the standard material, variations in composition may result in either high or low measurements.

It is an object of this invention to provide a device that produces an output signal which compensates for variations in the intensity of the radiation received by a radiation detector due to deviations in the temperature and composition of said material from predetermined calibration standards.

SUMMARY OF THE INVENTION

I have discovered that the foregoing object can be attained by providing means for producing a first signal dependent upon the temperature of the material. Further means is provided for converting said signal into a signal indicative of the percentage of compensation required due to the difference between said temperature and the temperature at which the standard material was measured. Additional means is provided for producing a third signal indicative of the percentage of compensation required due to any difference between the composition of the material being measured and the composition of the standard material. The total percentage compensation required is then obtained by algebraically adding said second and third signals to obtain a fourth signal. The fourth signal is then converted into an output signal indicative of the actual deviation in thickness from the nominal thickness of the material.

DESCRIPTION OF THE PREFERRED EMBODIMENT

Figure 1:
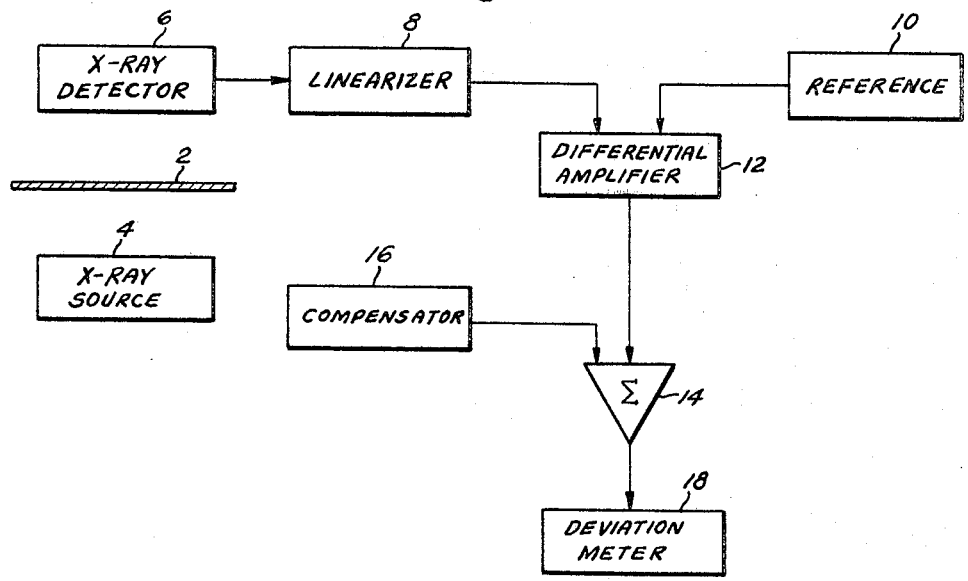
FIGURE 1 is a block diagram of a basic X-ray thickness gauge showing one possible use of the compensator of the invention.

Referring more particularly to the drawing, FIGURE 1 shows a material, e.g. hot steel strip 2, passing through an X-ray thickness gauge comprising a source 4 of X-rays, and an X-ray detector 6. The source 4 may be either D.C. or A.C., provided that the average energy of the emitted X-rays is constant. (A constant average energy results in constant absorption coefficients.) In the subject invention, the source is supplied with 110 kv., 360 hertz power, and the average energy of the emitted radiation is 92.6 kv. The output of the detector 6 is nonlinear; hence, the output is supplied to a linearizer 8 which produces a voltage which is substantially a linear function of the thickness of the strip 2.

To determine whether the thickness of the strip has deviated from the desired thickness, a reference 10 is provided. The reference 10 may, for example, comprise a plurality of voltages, each voltage corresponding to a known thickness and representing the exact voltage which would appear at the output of the linearizer 8 during the measurement of an identical material of the known thickness under identical measuring conditions.

The reference voltages may, for example, be obtained by measuring sheets of low carbon steel at 70° F. The hot steel strip, on the other hand, may comprise a chromium-molybdenum alloy and may be at a temperature of 1100 to 1900° F. during the measurement. Thus, even if the thickness of the steel strip corresponds exactly to that represented by the reference voltage, the output of the linearizer 8 will not equal the output of the reference 10, except for the unusual case where the effect of temperature deviation exactly balances the effect of composition deviation.

The outputs from the linearizer 8 and the reference 10 are supplied to a differential amplifier 12, the output therefrom representing the uncompensated thickness deviation. This output is then supplied to a summing amplifier 14, which also receives a signal from a compensator 16 which compensates for the deviations in temperature and composition of the hot steel strip from the predetermined standards for which the reference 10 was calibrated. The compensator 16 is the subject of this invention. The output from the amplier 14 represents the actual deviation in thickness of the steel strip being measured from the desired thickness. This ouput can be used for auomatically controlling the screwdowns on the rolls located upstream in the rolling mill, or may be supplied to a deviation meter 18, the readings of which may be used to manually adjust said screwdowns.

Figure 2:
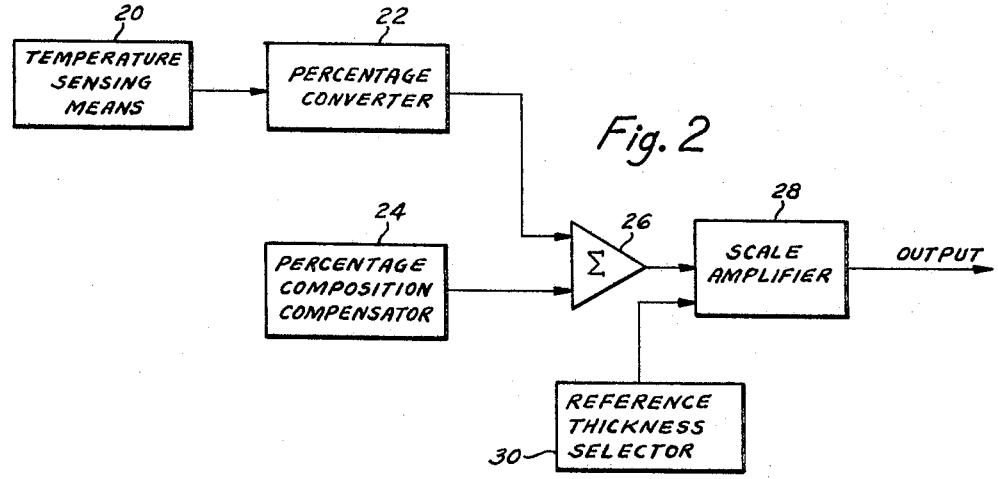
FIGURE 2 is a block diagram of the compensator of the invention.

As is shown in FIGURE 2, the compensator 16 broadly comprises a temperature sensing means 20, e.g. a pyrometer, positioned above the steel strip. The pyrometer transmits a millivolt signal to means 22 for converting said signal into a signal representative of percentage temperature compensation.

Depending upon the composition, desired final thickness required properties, etc., the temperature of hot steel strip passing through the X-ray gauge may vary from about 1100° F. to 1900° F. It has been found, for X-rays emitted with an average intensity of 92.6 kv. for example, that the steel will appear about 1.4% thinner at 1100° F. than at 70° F., and about 2.7% thinner at 1900° F. than at 70° F.

Means 22 comprises a servo motor which drives the slidewire of a potentiometer between an upper and a lower limit. In view of the foregoing, the upper limit is a signal representing 2.7% compensation while the lower limit is a signal representing 1.4% compensation. The output of the potentiometer is in terms of a predetermined voltage per percent of temperature compensation, e.g. 0.5 volt/percent.

In the instant case, the reference 10 was calibrated with standards of known thickness having the following composition (the absorption coefficient for each element being shown opposite the percentage of the element):

| Element | A, Percentage | B, $u$ (at 92.6 kv. generated) |
| --- | --- | --- |
| Carbon | 0.090 | 0.4579 |
| Manganese | 0.370 | 3.71 |
| Phosphorus | 0.016 | 0.4209 |
| Sulfur | 0.030 | 0.670 |
| Silicon | 0.010 | 0.6534 |
| Copper | 0.090 | 9.296 |
| Nickel | 0.060 | 8.686 |
| Chromium | 0.060 | 4.4988 |
| Molybdenum | 0.004 | 26.8498 |
| Tin | 0.006 | 32.8050 |
| Nitrogen | 0.002 | 0.1328 |
| Zirconium | 0.002 | 16.8728 |
| Aluminum | 0.027 | 0.6156 |
| Iron | 99.233 | 6.6725 |

The absorption coefficient of the standard was then determined by multiplying each number in column A by the opposite number in column B, adding the products, and dividing the sum by 100 to obtain 6.6556.

In order to have an absolute constant from which all calculations could be made, the absorption coefficient of the standard was compared with that of an absolute standard of pure iron, to yield the percentage deviation therebetween, as shown in Equation (b).

(b) $$100 \times \frac{6.6725 - 6.6556}{6.6725} = +0.25309\%$$

Inasmuch as the sign of the solution to Equation (b) is positive, the X-ray intensity measured by the subject gauge will be about 0.25% greater than that measured for pure iron of the same thickness.

The percentage composition compensation required due to deviations from the above composition can be easily determined, for a particular X-ray intensity, either empirically or by direct calculation. The percentage composition compensator 24, which may comprise a digital potentiometer controlled by a selector switch, produces an output voltage equal to 0.5 volt/percent of compensation.

The outputs from the percentage converter 22 and 24 are supplied to a summing amplifier 26, the output of which represents total required compensation and is in terms of volts per percent.

In order to convert the required compensation from terms of percent into terms of thickness, the output of the amplifier 26 is supplied to a scale amplifier 28 which is controlled by a reference thickness selector 30. The selector 30 may comprise a digital potentiometer in which, in effect, the nominal thickness of the strip being measured is multiplied by the total required percentage compensation.

As a specific example of the operation of the subject device, a steel strip of the following composition was passed through the subject gauge:

| Element: | Percentage |
| --- | --- |
| Carbon | 0.200 |
| Manganese | 0.700 |
| Phosphorus | 0.035 |
| Sulfur | 0.040 |
| Silicon | 0.350 |
| Copper | 0.200 |
| Nickel | 0.200 |
| Chromium | 0.150 |
| Molybdenum | 0.650 |
| Tin | 0.0 |
| Nitrogen | 0.0 |
| Zirconium | 0.0 |
| Aluminum | 0.150 |
| Iron | 97.325 |

By using the same methods of calculation used in connection with the standard, it was found that the steel had an absorption coefficient of 6.7418, and that the deviation between said coefficient and that of pure iron was −1.03792%. The minus sign indicates that the X-ray intensity measured by the subject gauge will be about 1.04% less than that measured for pure iron of the same thickness.

In order to relate the composition deviation of the steel being measured to the standard used for calibration, the deviation of the standard is subtracted from the deviation of the steel being measured, as shown in Equation (c).

(c) $$(-1.03792) - (+0.25309) = -1.29101$$

The minus sign in the solution to Equation (c) indicates that the X-ray intensity measured by the subject gauge will be about 1.29% less for the steel being measured than for the standard, if the steel and the standard are of the same thickness.

Inasmuch as the measured intensity is about 1.29% less by reason of composition, the steel being measured will appear about 1.29% thicker. Thus, the output of the percentage composition compensator 24 will be a voltage indicative of −1.29%. In the instant case, 0.5 volt has been selected per percent of required composition compensation. The output of compensator 24 is therefore −0.65 volt.

As the steel strip passes through the gauge its temperature is 1500° F. The pyrometer therefore supplies a signal which causes the servo motor to drive the slidewire of the potentiometer to a point half way between a voltage representing 1.4% and 2.7% temperature compensation, or 2.05%. Inasmuch as 0.5 volt represents each percent of required compensation, the output of the percentage converter 22 is 1.025 volts.

The output of the compensator 24 and the percentage converter 22 are algebraically added in summing amplifier 26 to yield the total required percentage compensation, as shown in Equation (d).

(d) $$(-1.29) + (2.05) = +0.76\%, \text{ or } 0.38 \text{ volt}$$

The positive sign in the solution of Equation (d) indicates that the strip will appear about 0.76% thinner.

The nominal thickness of the strip being measured is 0.250 inch. The output of the summing amplifier 26 is then supplied to the scaling amplifier 28 which produces an output signal indicative of the total required compensation, in terms of thickness. For the example given, this compensation would be a signal indicative of 0.0019 inch.

I claim:
1. In apparatus for determining the thickness of a material under test, comprising a source of penetrating radiation, having a constant average energy, positioned on one side of said material and a radiation detector positioned on the other side of said material, means for producing an output signal which compensates for variations in the intensity of the radiation received by said detector due to deviations in the temperature and composition of said material from predetermined calibration standards, comprising:
 (a) means for producing a first signal dependent upon the temperature of said material;
 (b) means for converting said first signal into a second signal indicative of the percentage of compensation required due to any deviation in said temperature from a predetermined value;
 (c) means for producing a third signal indicative of the percentage of compensation required due to any deviation in composition from a standard composition;
 (d) means for algebraically adding said second and third signals to obtain a fourth signal indicative of the total percentage compensation required due to deviations in both temperature and composition; and
 (e) means for converting said fourth signal into an output signal dependent upon the nominal thickness of said material.

References Cited
UNITED STATES PATENTS

| | | | |
|---|---|---|---|
| 3,004,163 | 10/1961 | Edholm | 250—83.3 |
| 3,060,313 | 10/1962 | Ohmart et al. | 250—43.5 |
| 3,148,278 | 9/1964 | Schonborn et al. | 250—83.3 |

RALPH G. NILSON, Primary Examiner

D. L. WILLIS, Assistant Examiner

U.S. Cl. X.R.

250—83.6